United States Patent [19]

Kosmowski

[11] Patent Number: 4,530,627
[45] Date of Patent: Jul. 23, 1985

[54] PINLESS ROUTER

[76] Inventor: Wojciech B. Kosmowski, 647 Young St., Santa Ana, Calif. 92705

[21] Appl. No.: 50,755

[22] Filed: Jun. 21, 1979

Related U.S. Application Data

[63] Continuation of Ser. No. 715,727, Aug. 19, 1976, abandoned.

[51] Int. Cl.³ ............................................. B23C 9/00
[52] U.S. Cl. .............................. 409/80; 144/134 A; 409/190; 409/233; 409/903
[58] Field of Search ............... 409/64, 197, 183, 205, 409/231, 137, 145, 241, 189, 185, 235, 132; 144/134 R, 134 A, 134 B, 134 C, 136 R, 252 R

[56] References Cited

U.S. PATENT DOCUMENTS

| | | | |
|---|---|---|---|
| 2,675,038 | 4/1954 | Carlson | 144/21 |
| 3,587,391 | 6/1971 | Pitts | 409/235 |
| 3,734,153 | 5/1973 | Reed | 144/134 B X |
| 3,770,031 | 11/1973 | Olson | 144/134 B X |
| 4,037,982 | 7/1977 | Clement | 409/137 |

Primary Examiner—William R. Briggs

Attorney, Agent, or Firm—Spensley Horn Jubas & Lubitz

[57] ABSTRACT

A pinless router comprising a router coupled to a movable support arranged and configured such that it has at least one separable portion which may be decoupled from the remainder of the support, a means for vertically moving the router and the support, a helical brush having a large central opening concentric with the router tool and which engages with a work piece when the pinless router is in operation, a means for moving the router together with the support in a horizontal plane, a means for decoupling the separable portion from the remainder of the support and a continuous vacuum applied to the central opening in the brush.

In operation, the pinless router is moved downwardly until the brush engages with the surface of the work piece. The routing operation is then substantially performed until just before the routing is completed. The pinless router is then stopped and moved downwardly until the separable portion engages with the work piece. The separable portion is then decoupled from the remainder of the support and the routing operation is completed. The separable portion is then recoupled to the support and the pinless router is moved upwardly and returned to the starting point.

18 Claims, 6 Drawing Figures

1

PINLESS ROUTER

This is a continuation of application Ser. No. 715,727, filed 8/19/76, abandoned.

FIELD OF INVENTION

This apparatus relates to routing machines and more particularly to automatic routing machines.

DESCRIPTION OF THE PRIOR ART

In manufacturing plants of the type wherein a large portion of the manufacturing operations involve repetitive operations, it is frequently necessary to provide machines capable of performing these repetitive operations. One of these repetitive operations frequently involves a routing operation.

In the prior art, there exists several automatic routing machines which perform the repetitive routing operations with varying degrees of success and/or difficulty. The basic automatic routing machine which exists in the prior art comprises a router which is automatically moved in the vertical direction and in a horizontal plane to complete the routing operation.

One example of such a prior art routing machine is described by Dosier in U.S. Pat. No. 3,880,047. Dosier utilizes a pneumatically actuated vertical control shaft to vertically move a spindle and its associated routing bit toward and away from the piece which is to be routed. The workpiece in the Dosier patent is secured on a laterally moveable base by a plurality of tooling pins. In operation, the Dosier machine provides the necessary routing by the coordinated vertical movement of the routing bit into the workpiece along with the lateral movement of the workpiece on the router base. Another example of a prior art routing machine is the "Router/Profiler" marketed by Paul Dosier Associates, Inc. in 1970. The Paul Dosier Associates device comprised up to four spindles which were moved in a vertical direction by a pneumatic cylinder. The workpiece which was to be routed was secured in place by tooling pins. A further example of a prior art routing machine is the "Routex" machine marketed by Advanced Controls Corporation in 1975. In addition, a general discussion of multiple-spindle, numeric controlled routing machines is given in the article entitled "An Analysis of Production and Cost Considerations—N/C Routing Vs. Blanking and Pin Routing For Printed Circuits" appearing in the December 1973 issue of "Insulation/Circuits."

These basic prior art automatic routers have several difficulties. The first of which is that inherent in a routing operation is the fact that a great amount of waste and debris is generated which is not cleaned up by this type of prior art routing machine and which results in an excessively dirty manufacturing area. Secondly, if the routing operation was of the type which formed a closed figure and was not just to form a slot or groove, when the router tool returned to the starting point, the rotational forces on the routing tool would cause the cut-out piece of the work piece to be thrown thereby causing a danger and a rough area in the routed out portion.

In order to overcome these difficulties, first a vacuum was added to the routing machine. The addition of the vacuum greatly reduced the amount of debris and waste scattered about the manufacturing area but did not eliminate the problem completely. Accordingly, brushes were added to the automatic router which contained the waste material and assisted the vacuum. The prior art brushes also reduced the problem but did not substantially eliminate it.

To overcome the problem which occurs when the router returns to the starting point in a closed loop cut-out, pins have been added to the face of the support which holds the routing tool and which engage with a pair of pin holes provided in the portion of the work piece which is to be cut out. This solution does eliminate the problem but creates its own additional problems. One of which is that the drilling of the pin holes in the work piece and the adding of pins requires additional steps and tooling in the manufacturing which results in an increase in the manufacturing cost.

Accordingly, it is the general object of the present invention to provide an automatic routing machine which is capable of routing a closed loop without requiring pins or pin holes in the to be cut out portion of the work piece.

It is another object of the present invention to provide an improved means for gathering up the waste and chips generated during the routing operation.

It is still another object of the present invention to provide an automatic router which is simple and relatively low in cost.

SUMMARY OF THE INVENTION

In keeping with the principles of the present invention, the objects are accomplished by a unique pinless router comprising a clamp or pressure foot movable in three dimensions and arranged and configured such that it has at least one separable portion which may be decoupled from the remainder of the support, a means for vertically moving the spindle and the support, a helical brush having a large central opening concentric with the cutting tool and which engages with a work piece when the pinless router is in operation, a means for moving the spindle together with the support in a horizontal plane, a means for decoupling the separable portion from the remainder of the support and a means for supplying a continuous vacuum to the central opening in the brush.

In operation, the pinless router is first moved downwardly by the vertical movement means until the brush engages with the surface of the work piece. As the pinless router moves downwardly, the cutting tool cuts into the work piece. The routing operation is then substantially performed until just before routing of the closed loop is completed. The pinless router is then stopped and the support is moved downwardly until the separable portion of the support engages with the surface of the work piece. The separable portion is then decoupled from the remainder of the support and the routing operation is then completed. The separable portion is then recoupled to the support and the pinless router is moved upwardly and returned to the starting point.

BRIEF DESCRIPTION OF THE DRAWINGS

The above mentioned and other features and objects of the present invention will become more apparent by reference to the following description taken in conjunction with the accompanying drawings, wherein like referenced numerals denote like elements and in which.

DESCRIPTION OF THE PREFERRED EMBODIMENT

Figure 1:
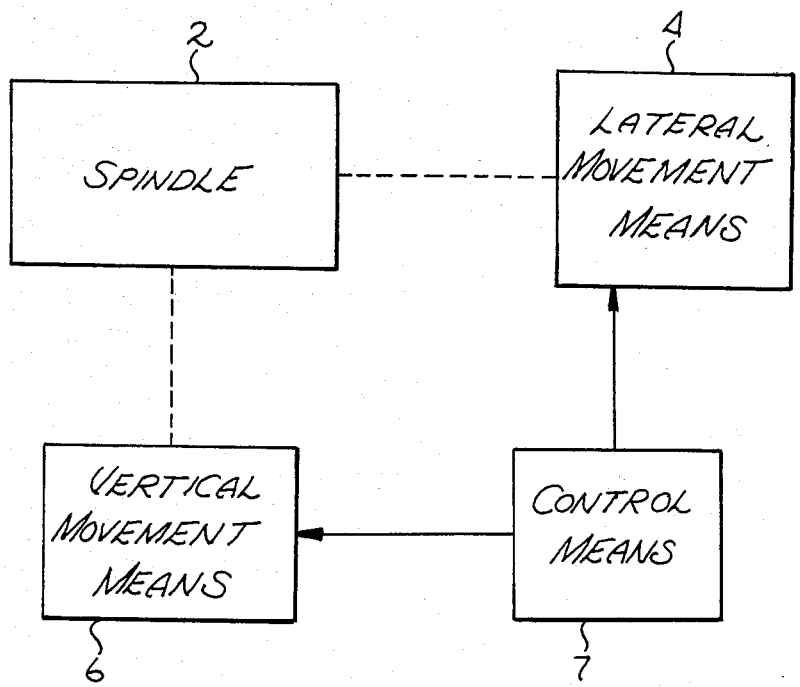
FIG. 1 shows a block diagram of a simplified basic router.

Referring more particularly to the drawings, shown in FIG. 1 is a block diagram of a basic automatic router. The automatic router of FIG. 1 comprises a spindle 2 which is coupled to and moved by both on lateral means 4 and a vertical movement means 6. The lateral means 4 is old in the art and typically comprises a table and support member each coupled to a lead screw mounted at 90° to each other which are controlled by servo motors. The spindle is usually mounted on the support member and the work piece is usually mounted on the table thereby creating a relative lateral movement between the two. The vertical movement means 6 moves the spindle up and down and comprises one portion of the present invention. Control means 7, controls lateral movement means 4 and vertical movement means 6 and insures that the lateral and vertical movement of spindle 6 are coordinated. Control means 7 further controls the operations of vertical movement means 6 so that it performs the functions described herein below. Furthermore, the control means 7 can be any prior art device capable of controlling the operation of lateral and vertical movement means 4 and 6 such as a tape reader, associated control circuitry, and electromechanical actuators.

Referring to FIGS. 3-6, shown therein is a pinless router in accordance with the teachings of the present invention. The pinless router comprises a spindle 2 which is coupled to the vertical movement means 6. The spindle 2 includes a chuck 5 and routing tool 8. The vertical movement means 6 comprises a pair of primary cylinders 10 which are coupled to the support member, not shown. A piston 12 is provided within each primary cylinder 10 and is coupled at one end to upper member 14. Cylinders and pistons 10 and 12 may be coupled to either a source of pressurized hydraulic fluid, not shown, or may be pneumatically actuated by compressed air.

Lower member 16 is slidably coupled to upper member 14. Spring recesses 18 are provided in the edge of lower member 16 and springs 20 extend between the spring recess 18 and a spring retainer 22 coupled to upper member 14.

Upper member 14 is further provided with a pair of secondary cylinders 24. Within secondary cylinders 24 is disposed a piston 26 having a pin member 28 which extends through holes 30 and 32 in the upper and lower members respectively. Similarly to the primary cylinder and piston 10 and 12, secondary cylinders and pistons 24 and 26 may be either hydraulically or pneumatically actuated. Furthermore, the upper end of holes 32 in lower member 16 is provided with a bevel 34.

Figure 6:
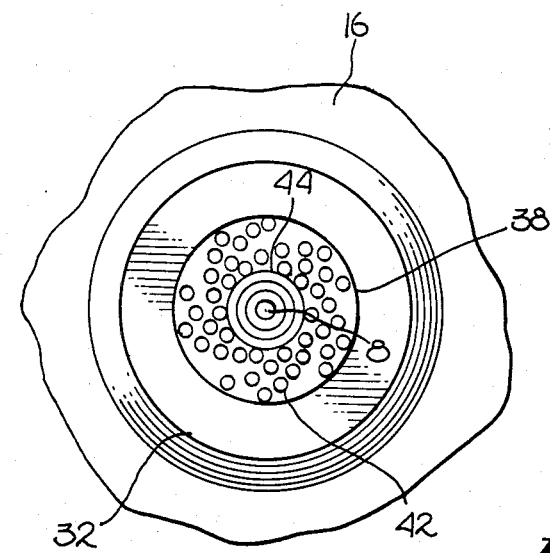
FIG. 6 is a cross-sectional view of the pinless router of FIG. 3.

The central section 36 of lower member 16 is substantially cylindrical in shape and extends downward from the remainder of lower member 16. Central section 32 is provided with a brush member 38 which is resiliently coupled to central portion 36 by spring member 40 such that brush 38 is capable of small movements in the vertical direction. Brush 38 comprises a plurality of stiff bristle members 42 arranged in the bottom surface in a helical pattern, as shown in FIG. 6. Furthermore, the brush 38 is provided with a large central hole 44 through which tool 8 of spindle 2 extends. The bottom portion of spindle 2 together with upper and lower members 16 and brush 38 form a chamber 46 to which a continuous vacuum is applied via vacuum fitting 48.

Figure 2:
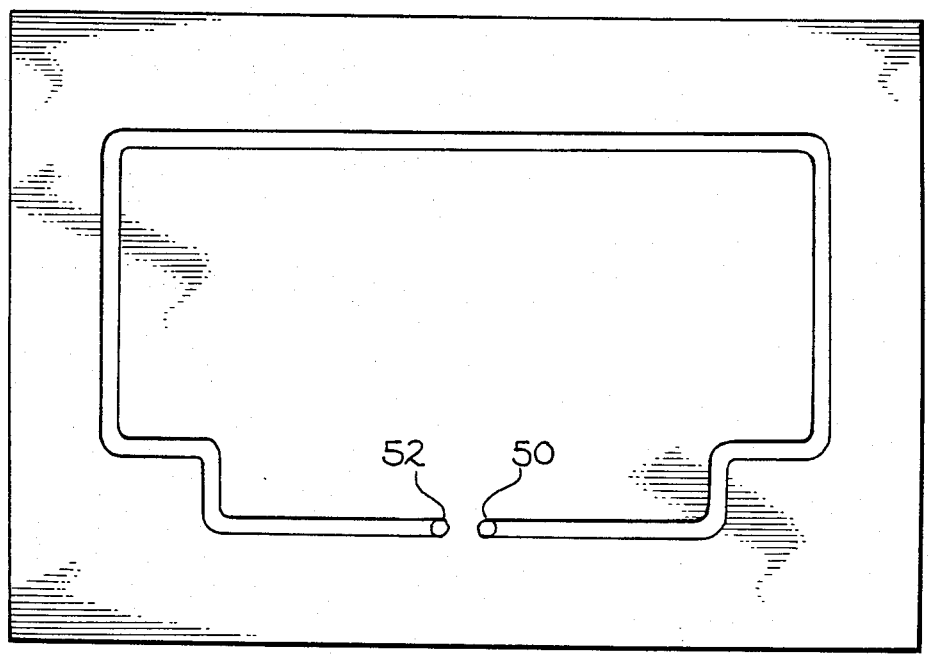
FIG. 2 is an illustration of cutting one of the images from the panel or work piece.
Figure 3:
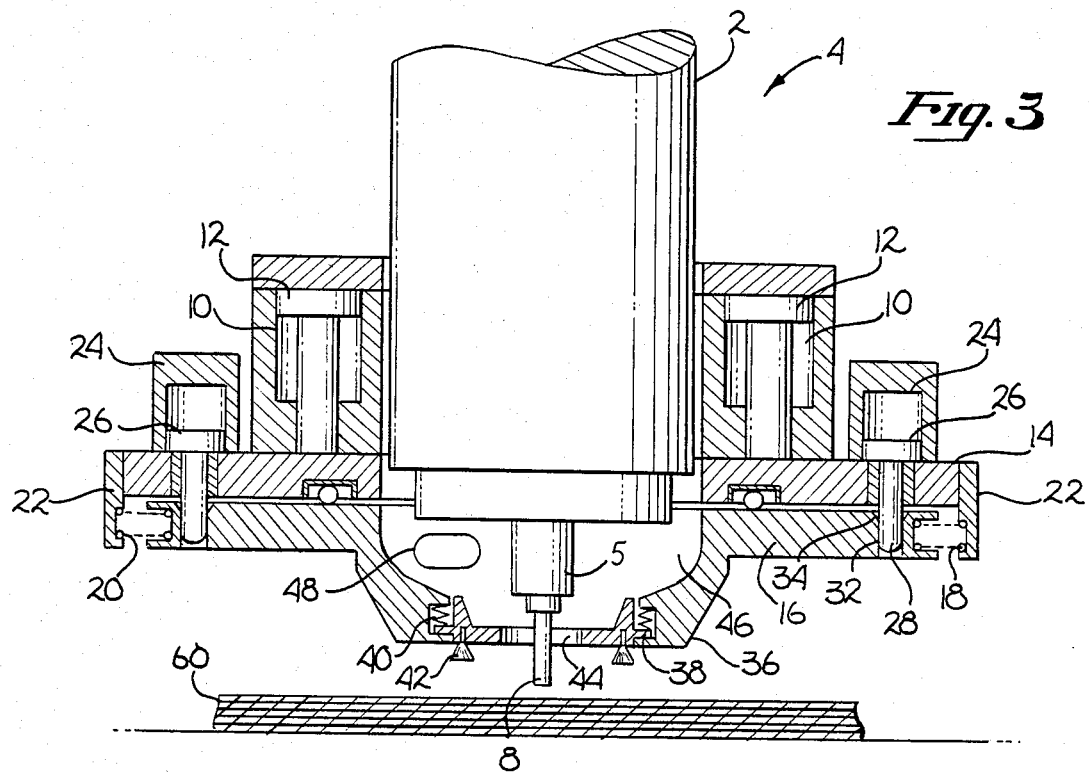
FIG. 3 is a cross-sectional view of a pinless router in accordance with the teachings of the present invention at the point of its operation cycle just before routing of the work piece is commenced.
Figure 4:
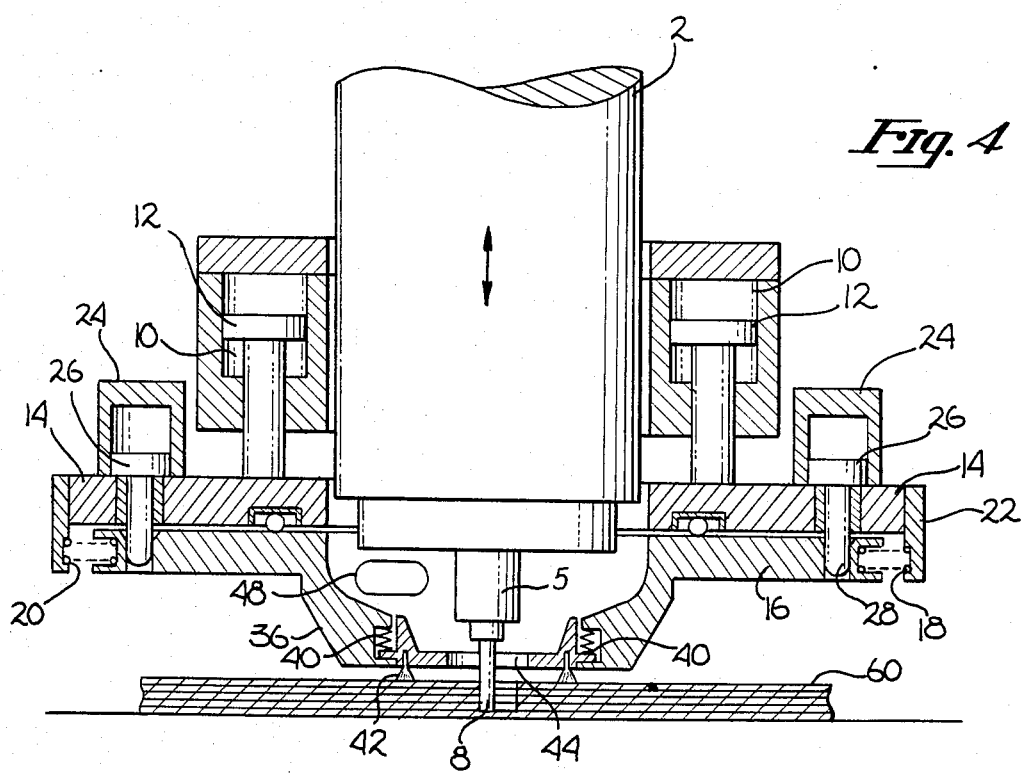
FIG. 4 is a cross-sectional view of a pinless router in accordance with the teachings of the present invention showing the pinless router in that stage of its operation where it is routing the work piece.

In operation, referring to FIGS. 2-5, the pinless router is in the condition substantially as shown in FIG. 3 just before it is lowered to begin routing at point 50 in FIG. 2. To begin routing, primary cylinders and pistons 10 and 12 are actuated thereby causing the upper and lower members 14, 16 to move downwardly from the position shown in FIG. 3 to the position shown in FIG. 4, while the vertical movement means 6 also causes the spindle 2 to move downwardly. Primary cylinders and pistons 10 and 12 are actuated until bristles 42 of brush 38 contact the top surface of the work piece 60 as shown in FIG. 4. In FIG. 4 is shown the configuration of the spindle 2 and vertical movement means during substantially all of the routing of the closed routing loop shown in FIG. 2. In this position, the work piece 60 is routing and any chips or waste which are generated during the routing process are sucked up by the vacuum applied to chamber 46 through vacuum connector 48. Furthermore, as a secondary portion of the invention, the helical disposition of the bristles 42 on the brush 38 causes the air which is drawn in by the vacuum to swirl in substantially a helical pattern. Due to this swirling effect, the chips and waste are more effectively accumulated and vacuumed up.

Figure 5:
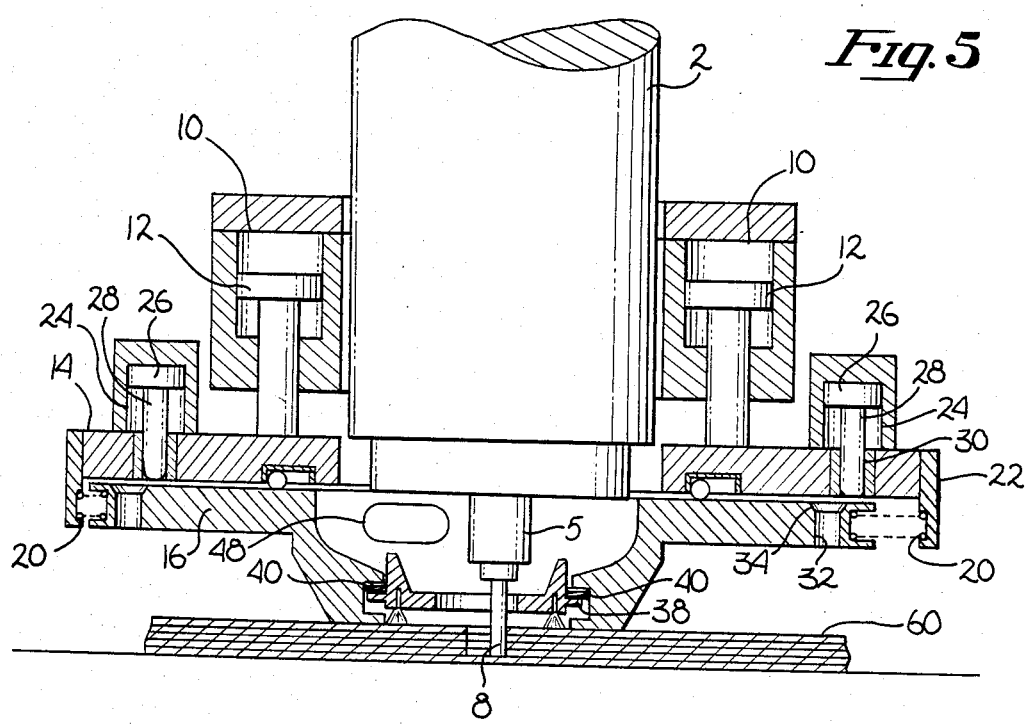
FIG. 5 is a cross-sectional view of a pinless router in accordance with the teachings of the present invention at that stage in its cycle of operation where it is completing the routing pass.

The routing continues as shown in FIG. 4 until just before the completion of the closed loop routing at point 52. At point 52, primary cylinders and pistons 10 and 12 are further actuated such that the bottom surface of central portion 36 of lower member 16 engages with and presses downwardly against the top surface of the workpiece 60 and holds the workpiece 60, as shown in FIG. 5. Furthermore, secondary cylinders and pistons 24 and 26 are actuated causing pin member 28 to be extracted from hole 32 in lower member 16 thereby decoupling lower member 16 from upper member 14 to allow upper member 14 to move in a horizontal direction relative to lower member 16. As the bottom surface of central portion 36 moves downward towards the work piece 60, brush 38 remains in a fixed position and spring means 40 is compressed. The last portion of the routing is then completed by moving the spindle together with the primary cylinders and pistons 10 and 12 and upper member 14 relative to the lower member 16 and the work piece 60. Since there is a large hole 44 provided in brush 38, tool 8 can be moved without contacting brush 38. Furthermore, when upper member 14 moves relative to lower member 16 one of the springs 20 is compressed while the other is allowed to expand. It should be apparent to one skilled in the art that since the tool 8 of spindle 2 has previously extended downwardly into work piece 60 to the maximum depth possible, spindle 2 is coupled to the vertical movement means 6 such that when the upper and lower member 14 and 16 are caused to be moved downwardly as shown in FIG. 5, the spindle 2 remains at its fixed depth of penetration into the work piece 60.

After the closed loop routing has been completed and the routing tool is now at point 50, primary cylinders and pistons 10 and 12 are actuated to cause the spindle together with lower and upper members 14 and 16 to move upwardly. As soon as the lower surface of lower member 16 disengages with the upper surface of the work piece 60, springs 20 cause the lower member 16 to move to a position such that the tool 8 is centered in hole 44 and pins 28 are substantially centered above holes 32 and lower member 16. Secondary cylinders and pistons 24 and 26 are then actuated to cause pins 28 to extend into holes 32 in lower members 16. The bevelled portion 34 holes 32 assist the pins 28 and help prevent the pin 28 from getting hung-up. Primary cylinders and pistons 10 and 12 continue to cause the lower and upper members 14 and 16 to move upward until the starting position shown in FIG. 3 is again achieved. At this point in time, the pinless router is ready to rout another work piece.

It should be apparent to one skilled in the art that electromechanical means could be substituted for the primary cylinders and pistons 10 and 12 and/or the secondary cylinders and pistons 24 and 26. Furthermore, it should be apparent that one could design the system such that only a single primary cylinder and piston 10 and 12 and/or a single secondary cylinder and piston 24 and 26 were utilized. Also, it is within the scope of the invention that more than two springs 20 could be utilized.

In all cases, it is understood that the above described embodiment is merely illustrative of but one of the many possible specific embodiments which can represent applications of the principles of the present invention. Numerous and varied other arrangements can be readily devised in accordance with these principles by those skilled in the art without departing from the spirit and scope of the invention.

I claim:
1. In a lateral movement router machine having a pressure foot, said router machine being of the type having a spindle carriage or like support member, at least one spindle mounted to the support member and vertically movable with respect thereto, and a means for causing relative lateral movement between said support member and a work piece, the pressure foot comprising:
   (i) an upper member;
   (ii) a holding member mounted to and beneath said upper member for relative lateral movement with respect to said upper member when decoupled therefrom;
   (iii) decoupling means mounted on said upper member for selectively coupling said holding member to said upper member to prevent said relative lateral movement therebetween and decoupling said holding member from said upper member to enable said relative lateral movement therebetween; and
   (iv) vertical movement means for vertically displacing said holding member and said upper member, said vertical movement means comprising at least one actuator coupled to said support member and said upper member; and
   control means for directing said vertically movable spindle, said means for causing lateral movement, said decoupling means and said vertical movement means to (1) move said upper member and said holding member downward, relative to said work piece, from a first position to a second position when routing is begun on said work piece; (2) to cause said holding member and said upper member to remain in said second position until just before the routing is completed, (3) at which time (a) to cause said actuator to move said holding member and said upper member farther downward to a third position in which said holding member firmly presses against and thus secures said work piece, and (b) to cause said decoupling means to decouple said holding member from said upper member, thereby enabling said holding member to remain stationary and secure said work piece while said control means directs said means for causing lateral movement to move said spindle and said upper member laterally relative to said holding member and secured work piece until the routing is completed.

2. A router machine having a pressure foot according to claim 1 wherein said actuator comprises at least one piston and cylinder.

3. A router machine having a pressure foot according to claim 2 wherein said at least one piston and cylinder is hydraulically actuated.

4. A router machine having a pressure foot according to claim 2 wherein said at least one cylinder and piston is pneumatically actuated.

5. A router machine having a pressure foot according to claim 1 further comprising a brush resiliently mounted to the bottom of said holding member facing said work piece, whereby said brush firmly presses against said work piece when said upper member and said holding member are in said second and third positions.

6. A router machine having a pressure foot according to claim 5 wherein said brush includes a plurality of bristles arranged in helical patterns.

7. A router machine having a pressure foot according to claim 6 wherein said brush has a central hole which is concentric with said spindle, and said pressure foot further comprises means for applying a continuous vacuum to said hole in said brush.

8. A router machine having a pressure foot according to claim 1 wherein said decoupling means comprises at least one piston and cylinder, said cylinder being mounted on said upper member, said piston including a pin which protrudes into a hole in said holding member to couple said holding member to said upper member and which is withdrawn from said hole to decouple said holding member from said upper member.

9. In a lateral movement router machine having a pressure foot, said router machine being of the type having a spindle carriage or like support member, at least one spindle mounted to the support member and vertically movable with respect thereto, and a means for causing relative lateral movement between said support member and a work piece, the pressure foot comprising:
   (i) an upper member concentrically disposed about the lower portion of said spindle;
   (ii) a holding member selectively coupled to the lower surface of said upper member and concentrically disposed about the lower portion of said spindle, said holding member having at least one recess disposed therein;

(iii) an engaging member coupled to the lower surface of said holding member;

(iv) decoupling means for selectively decoupling said holding member from said upper member, said means comprising at least one first piston coupled to and extendable from said upper member into said recess in said holding member;

(v) at least one cylinder coupled to said support member and one second piston disposed within said cylinder and coupled to said upper member, said cylinder and second piston adapted to vertically displace said holding member, said engaging member and said upper member relative to said support member, together with;

control means for enabling actuation of said second piston so as to move said upper member, said holding member and said engaging member downward, relative to said work piece, from a first position to a second position when routing is begun on said work piece, for enabling said holding member, said engaging member, and said upper member to remain in said second position until just before the routing is completed, and, at which time (a) to enable said second piston to move said holding member, said engaging member and said upper member farther downward to a third position in which said engaging member firmly presses against and thus secures said work piece, and (b) to decouple said holding member from said upper member via the retraction of said first piston from said recess in said holding member, thereby enabling said engaging member to remain stationary and secure said work piece while said means for causing lateral movement causes said spindle and said upper member to move laterally relative to said engaging member and said work piece until the routing is completed.

10. In combination with a router having a spindle assembly including a spindle, a collet and a router bit, a worktable beneath said router bit for supporting a workpiece, said worktable being movable laterally relative to said router bit for causing said router bit to produce in said workpiece a cut along a predetermined line, which cut upon completion thereof will produce a cutout part from the portion of said workpiece within said line, said router bit exerting a relative lateral force on said workpiece such that when said router bit has reached a predetermined point on said line and prior to completion of said cut, said router bit will cause lateral motion of said portion of said workpiece relative to said worktable unless said portion is restrained, a device for selectively holding said workpiece comprising:

a housing carried by said spindle assembly, said housing defining a chamber around said spindle assembly;

a slide member in said chamber, said slide member being substantially parallel to said worktable and having an opening receiving said router bit;

a first annular member of relatively high coefficient of friction carried by said slide member, said first annular member circumscribing said router bit and having a projecting face adjacent said worktable;

a second annular member of relatively low coefficient of friction;

a support member carrying said second annular member so that said second annular member circumscribes said router bit, and has a projecting face adjacent said worktable;

a first spring means biasing said support member to an outer position where said second annular member projects beyond said first annular member for engaging a workpiece on said worktable;

a second spring means biasing said slide member to a normal centered position within said chamber;

lock means holding said slide member in said centered position;

means for pressing said housing toward said worktable with a first force sufficient to cause said second annular member to bear against such a workpiece and hold said workpiece flat on said table while said router bit produces such a cut in said workpiece;

means for pressing said housing toward said worktable with a second and larger force sufficient to cause said support member to be pushed inwardly in opposition to said first spring means to be retracted position and to bring said first annular member into engagement with said workpiece around said router bit for holding said workpiece, including the portion thereof within said cut line, against movement relative to said worktable during the final increment of said cut for thereby preventing motion of said cutout portion of said workpiece relative to the remainder of said workpiece, and means for releasing said lock means and permitting said slide member to move within said chamber relative to said housing during said final increment of said cut, said last-mentioned means being operable substantially simultaneously with said means for pressing said housing toward said workpiece with a second and larger force.

11. In combination with a machine tool having a spindle means, a cutting tool rotatable by said spindle means and worktable means for supporting a workpiece for being cut by said cutting tool, said worktable means and said spindle means being relatively laterally movable for producing a cut in said workpiece along a predetermined line, which cut upon completion thereof will produce a cutout part from the portion of said workpiece within said line, said cutting tool exerting a relative lateral force on said workpiece such that when said cutting tool has reached a predetermined point on said line and prior to completion of said cut, said cutting tool will cause lateral motion of said portion of said workpiece relative to said worktable means unless said portion is restrained, a device for selectively restraining said workpiece comprising:

clamping means, said clamping means including workpiece-engaging means, and means operable when said cutting tool has made a substantial portion of said cut for causing said workpiece-engaging means to engage the surface of said portion of said workpiece and force said portion of said workpiece against said worktable means for preventing movement thereof relative to said worktable means during completion of said cut, said worktable means and said workpiece engaging means being relatively laterally moveable during said cut and prior to said completion of said cut, said workpiece-engaging means exerting no substantial restraint against such lateral motion of said portion of said workpiece when said cutting tool makes said substantial portion of said cut.

12. A device as recited in claim 11 in which said workpiece-engaging means is laterally stationary relative to said spindle means and laterally movable relative to said worktable means during said substantial portion of said cut, and is laterally stationary relative to said worktable means and laterally movable relative to said spindle means when so forcing said portion of said workpiece against said worktable means during said completion of said cut.

13. A device as recited in claim 12 in which said clamping means includes releasable stop means for rigidly holding said workpiece-engaging means laterally stationary relative to said spindle means during said substantial portion of said cut, and resilient means biasing said workpiece-engaging means to a predetermined lateral position relative to said spindle means.

14. A device as recited in claim 13 in which said stop means so rigidly holds said workpiece-engaging means in said predetermined lateral position relative to said spindle means.

15. The method of producing a cutout part from a workpiece of larger lateral dimension than that of said cutout part comprising the steps of positioning said workpiece on a supporting surface,
holding said workpiece against lateral movement relative to said supporting surface by engaging a first portion of said workpiece,
engaging a second portion of said workpiece remote from first portion thereof by a rotating cutting tool, producing relative lateral movement between said cutting tool and said workpiece in a predetermined pattern so as to cut said workpiece along a predetermined line, such that at a first predetermined position along said line a cutout part remote from said first portion of said workpiece and unrestrained by said engagement of said first portion of said workpiece will be produced from said workpiece,
and such that a second predetermined position along said line immediately adjacent said first predetermined position said cutting tool will produce a lateral force on the portion of said workpiece interconnecting said cutout part and the adjacent portions of said workpiece sufficient to cause movement of said cutout part laterally relative to said supporting surface if said cutout part is unrestrained against such movement, biasing a means against said workpiece for biasing said workpiece against said supporting surface during said relative lateral movement between said workpiece and said cutting tool while holding said means substantially laterally fixed relative to said cutting tool, and then releasing said means so that said means is laterally movable relative to said cutting tool, and engaging said cutout part by said means adjacent said cutting tool before said cutting tool reaches said second predetermined position and forcing said cutout part against said supporting surface such that said cutout part is held against movement relative to said supporting surface as said cutting tool reaches said second and said first predetermined positions.

16. The method as recited in claim 15 in which said engagement of said cutout part adjacent said cutting tool is made immediately prior to said cutting tool's reaching said second predetermined position.

17. In combination with a machine tool having a spindle, a cutting tool rotatable by said spindle, a worktable means beneath said cutting tool for supporting a workpiece, said worktable means being movable laterally relative to said cutting tool for causing said cutting tool to produce in said workpiece a cut along a predetermined line which cut upon completion thereof will produce a cutout part from the portion of said workpiece withing said line, said cutting tool exerting a relative lateral force on said workpiece such that when said cutting tool has reached a predetermined point on said line and prior to completion of said cut, said cutting tool will cause lateral motion of said portion of said workpiece relative to said worktable means unless said portion is restrained, a device for selectively holding said portion of said workpiece within said cut line comprising
a body adjacent said spindle and fixed against lateral movement relative to said spindle,
a workpiece-engaging means carried by said body and movable laterally relative to said body, and
force means operable when a substantial portion of said cut has been made for forcing said workpiece-engaging means against said portion of said workpiece for clamping said portion of said workpiece against said worktable means and preventing lateral movement of said portion of said workpiece relative to said worktable means,
whereby upon said relative movement of said worktable means and said cutting tool during the completion of said cut said workpiece-engaging means is stationary relative to said worktable means and move laterally relative to said body.

18. A device as recited in claim 17 including in addition means for preventing lateral movement of said workpiece-engaging means relative to said body while said cutting tool makes said substantial portion of said cut, and for releasing said workpiece-engaging means and allowing said lateral movement of said workpiece-engaging means relative to said body during said completion of said cut.

* * * * *